United States Patent [19]

Miller et al.

[11] Patent Number: 5,079,731
[45] Date of Patent: Jan. 7, 1992

[54] METHOD AND APPARATUS FOR PROCESS CONTROL VALIDATION

[75] Inventors: G. Raymond Miller, Burleson; Paul E. Morgan, Everman, both of Tex.

[73] Assignee: Alcon Laboratories, Inc., Fort Worth, Tex.

[21] Appl. No.: 422,615

[22] Filed: Oct. 17, 1989

[51] Int. Cl.$^5$ .............................................. G06G 7/48
[52] U.S. Cl. ................................... 364/578; 364/419; 364/580
[58] Field of Search ...................... 364/578, 920, 933.8, 364/192, 149, 151, 221.2, 916.3, 419, 580, 188; 360/5; 371/19

[56] References Cited

U.S. PATENT DOCUMENTS

| | | | |
|---|---|---|---|
| 4,408,291 | 10/1983 | Gunzberg et al. | 364/900 |
| 4,484,266 | 11/1984 | Becker et al. | 364/200 |
| 4,494,191 | 1/1985 | Itoh | 364/200 |
| 4,613,952 | 9/1986 | McClanahan | 364/578 |
| 4,713,756 | 12/1987 | Mackiewicz et al. | 364/200 |
| 4,870,561 | 9/1989 | Love et al. | 364/192 |

OTHER PUBLICATIONS

Fry, *Pharmaceutical Engineering*, "FDA Regulation of Computer Systems in Drug Manufacturing," Sep./Oct. 1988; vol. 8, No. 5.
Miller, "Process Control Validation," Presented at Computer Systems Validation Seminar, Oct. 12-13, 1988.

*Primary Examiner*—Parshotam S. Lall
*Assistant Examiner*—Ellis B. Ramirez
*Attorney, Agent, or Firm*—Richards, Medlock & Andrews

[57] ABSTRACT

A process control and simulator system, such as for use in the manufacture of pharmaceutical products, includes a process control computer which commands and responds to the operation of the process input/output hardware. A simulator computer commands the operation of simulator input/output hardware. The process hardware and simulator hardware are connected by field lines which transfer signals that correspond to the signals that would be produced in actual production operations. The software in the simulator computer not only produces the simulation functions but in addition monitors the outputs from the simulator input/output hardware and records these outputs during the simulation process. The commands produced by the simulator computer, in response to the simulator input/output hardware outputs, are likewise monitored and recorded in a documentation file within a disk drive of the simulator computer. This documentation file serves to document the operation of the process control computer, process hardware, simulator computer and simulator input/output hardware for the purposes of providing validation of the system operation.

9 Claims, 4 Drawing Sheets

METHOD AND APPARATUS FOR PROCESS CONTROL VALIDATION

TECHNICAL FIELD OF THE INVENTION

The present invention pertains in general to computer control of processes, such as the manufacture of pharmaceuticals, and in particular to methods and apparatus for verifying the proper operation of such computer control processes and associated simulators.

BACKGROUND OF THE INVENTION

Computerized process control systems have come into widespread use in the manufacture of chemicals and pharmaceuticals. Such systems substantially reduce the manual labor which has previously been required and further tend to reduce the possibility of errors in such operations. However, the process control computer system and its software must be validated to ensure that the required manufacturing sequences are properly carried out. To produce such validation, it is often necessary to utilize a simulator system which reproduces the actions of the actual process hardware so that, for effective purposes, the computerized control system is running the various process operations for which it was designed. The simulation system is often available prior to the actual process hardware so that the process control software can be developed concurrently with the process hardware. The use of a simulator reduces the need for maintaining and operating expensive hardware, and the consuming of expensive materials. In addition, the simulator can be used for training purposes.

The computer control and software associated with a simulation system must validated in order to ensure their proper operation. Such validation has, in some cases, proven to be more expensive than validation of the process control system itself. This increased expense is attributable to the fact that the simulation system must not only demonstrate proper system operation, but must also include expected failure modes as well. Further, the validation of a simulator system may be more difficult than validating the process control system.

The pharmaceutical industry is regulated by the U.S. Food and Drug Administration. Regulations of this agency require that there be detailed documentation for computer systems which are to be used in the production of pharmaceutical products. The term "validation" is defined as the documentation which shows that a computer system has performed as it is intended to perform. Validation includes a variety of documentation such as application source code, installation information, design specifications, results of testing, printouts, etc. A key requirement in the validation is documentation which shows that the simulator is properly generating the desired conditions, both normal and error conditions. The processes required for each product must be separately documented.

In view of the requirement to validate simulator and computer processes in the pharmaceutical industry, and the difficulty of producing proof that a computer program works as intended, there exists a need for a method to document the operation of the system for validation purposes.

SUMMARY OF THE INVENTION

A selected embodiment of the present invention is a method for documenting process control and simulation operation in a system having a process control computer which transmits commands to and receives responses from process input/output hardware and a simulator computer which transmits commands to and receives responses from simulator input/output hardware. The method includes the first step of monitoring the output signals produced by the simulator hardware in response to input signals received at the simulator hardware from the process hardware. The occurrence of the output signals is recorded in a documentation file at the simulation computer. Command signals are generated by the simulator computer and are transmitted to the simulator hardware. These command signals are generated in response to the input signals received from the simulator hardware. The occurrences of the command signals which are generated by the simulator computer, are recorded in the documentation file at the simulator computer to produce documentation for the operation of the process control computer and the simulator computer.

In a still further aspect of the present invention, the above-described operations are carried out in conjunction with the generation of the simulation functions wherein both the simulation functions and the monitoring of the output signals from the simulator hardware and the recording of the command signals produced by the simulator computer are performed by the software within the simulator computer.

DETAILED DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
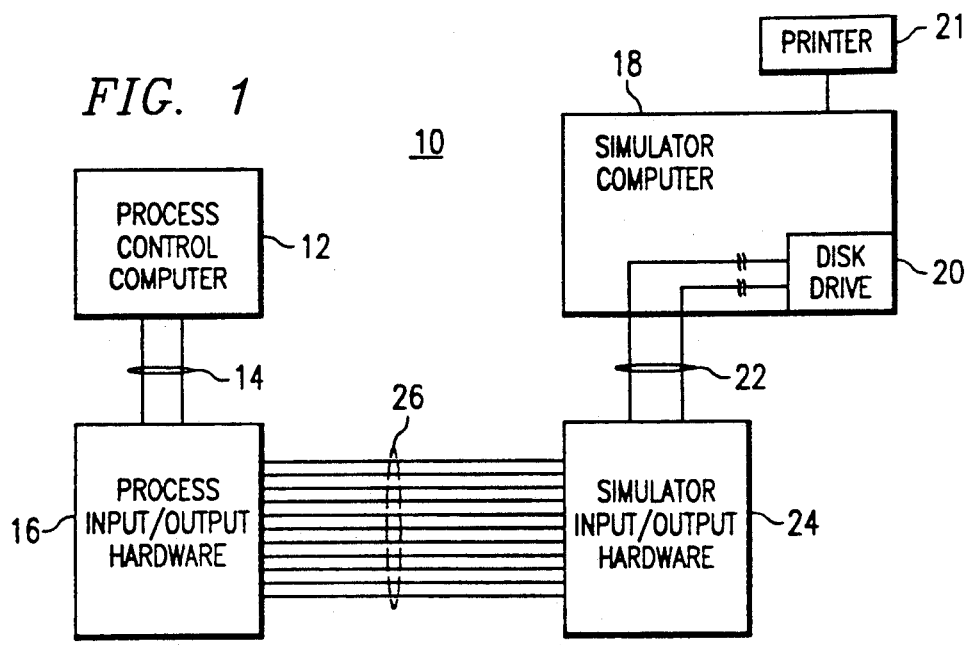
FIG. 1 is a block diagram of a process control system together with a simulator system.

A block diagram of a process control and simulator system 10 is illustrated in FIG. 1. Such a system can be utilized to simulate the manufacture of pharmaceutical products for the purpose of testing both the process control hardware and software. The system 10 includes a process control computer 12 which is connected through a bidirectional bus 14 to process input/output hardware 16.

The system 10 further includes a simulator computer 18 that includes a disk drive 20. The computer 18 is connected through a bidirectional bus 22 to simulator input/output hardware 24. A printer 21 is connected to computer 18.

The process control computer 12 is preferably a model PDP 1123 computer made by Digital Equipment Corporation and obtained from Fischer & Porter of Warminster, Pa. The process hardware 16 is likewise manufactured by Fischer & Porter. The simulator computer 18 is a personal computer Model AT, such as manufactured by IBM and numerous other companies which produce compatible computers. The simulator hardware 24 is manufactured by OPTO 22 Incorporated, which is located in Huntington Beach, Calif.

The simulator hardware 24 can simulate digital input and outputs, contact closures and analog signals, typically in the range of 4 to 20 milliamps. The simulator hardware 24 comprises a plurality of computer boards which communicate with each other by means of an industry standard RS-422 bus. A converter is utilized to transfer from the RS-422 bus to an industry standard RS-232 bus, which is used for the bus 22. Therefore, the simulator computer 18 can be a standard IBM model AT or compatible computer, which is widely available in the industry.

Figure 2:
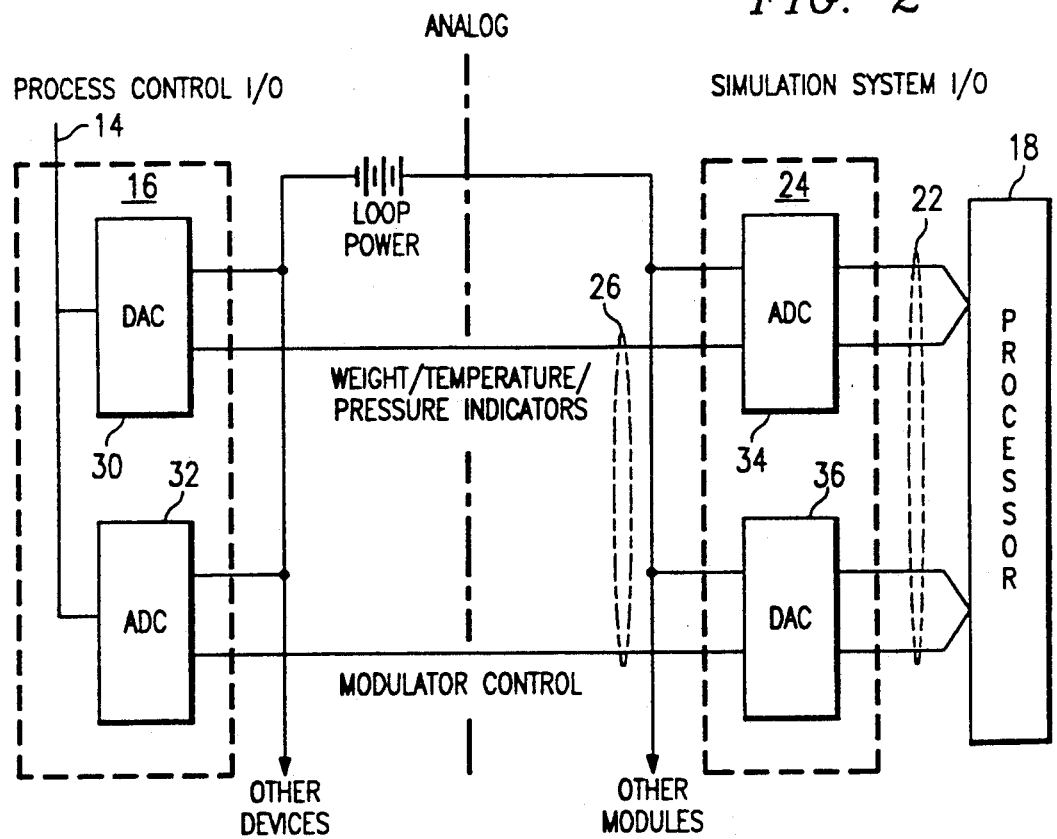
FIG. 2 is an expanded block diagram for the process input/output hardware and the simulator input/output hardware shown in FIG. 1.

More detailed schematic diagrams of the process hardware 16 and simulator hardware 24 are illustrated in FIG. 2.

The process hardware 16 is connected to the simulator hardware 24 by a plurality of field lines 26. Each of these lines conveys a signal in one direction or the other. For example, the process input/output hardware 16 may drive a line to a given voltage state to indicate that a valve should be opened or closed. The system 10 operates in a closed loop manner so that the simulator input/output hardware 24 produces a signal which is transmitted back to the hardware 16 through one of the lines to indicate the state of a valve, such as open, intermediate or closed. The simulator input/output hardware 24 likewise produces signals on the lines 26 to indicate temperature, weight or other parameters.

The process hardware 16 can further generate signals to indicate that a motor should be activated, materials should be added to a mix, a heater should be turned on, or that a liquid should be drained. In response to each of these commands, the simulator input/output hardware 24 has return signals for producing an indication that parameters have been changed.

Software within the process computer 12 generates the commands necessary for producing a particular process operation and monitors the return signals from the simulator to determine if the proper steps are being carried out. Thus, the simulator computer is programmed to react to each of the inputs received on the field lines 26 in the same manner as actual production process equipment.

An example of a unit operation, as part of a production process, which might be carried out by the process control computer 12 is as follows:

Rinse mix pack:
Open drain valve
Open bottom valve
Open water valve
Wait 10 minutes/*flush with water*/
Close water valve
Wait 3 minutes/*allow tank to drain*/
Close bottom valve
Wait 1 minute/*allow drain to empty*/
Close drain valve.

For a particular pharmaceutical production operation, the process control computer 12 utilizes a plurality of unit operations which are each carried out. The simulator computer 18, in conjunction with the simulator input/output hardware, must provide the responses for each step of these operations.

The operation of the present invention in general is described in reference to FIG. 1. A set of process instructions, including unit operations as described above, is developed for a particular production operation. These are loaded into the process computer 12 and operation is begun. Various commands are generated by the computer 12 and transmitted via the bus 14 to the process input/ouput hardware 16. Each of the commands generates a signal that is transmitted via one of the wires within the lines 26. The process input/output hardware 16 further monitors certain ones of these lines for responses from the simulator input/output hardware 24. These monitored signals are then transferred via the bus 14 back to the process control computer 12.

The signals received at the simulator input/output hardware 24 are transferred as output signals through the bus 22 to the simulator computer 18. Upon receipt of each of these output signals, the simulator computer 18 generates an appropriate command which is transmitted via the bus 22 back to the simulator input/output hardware 24. These commands are then transferred, as signals, which are transmitted through the appropriate ones of the lines 26 back to the process input/output hardware 16.

Software within the simulator computer 18, in the process of performing the necessary simulation functions, also monitors the output signals from the simulator input/output hardware 24 and records each of these output signals in a documentation file on the disk drive 20. The software within the simulator computer 18 further records in this documentation file each of the commands that it generates in response to the output signals from the simulator hardware 24. The resulting documentation file which is stored on the disk drive 20 represents the actions carried out for the process operation which was loaded into the process control computer 12.

After the process operation is completed, the documentation file is transferred from the disk drive 20 to the printer 21. A record of the process operations is thus produced on paper. The actual production record, as produced at the printer 21, is then compared to the process control steps which were input to the process control computer 12 for the process operation. If the operations which were scheduled to occur did actually occur in the proper sequence and for the proper times, there is then shown a validation of this process operation. The printed production operations and the original process requirements form the documentation necessary for validation of both the hardware and software for the process control computer 12 and the simulator computer 18.

If a particular production operation is changed, it can be validated by running it in the process control computer 12 and producing the documentation record described above. The documentation record is then compared to the modified process operation to determine if the operation is correct. If so, this serves as documentation for validation of the modified process.

FIG. 2 illustrates in detail the elements within the process input/output hardware 16 and simulator input/output hardware 24. The computer 12 communicates through bus 14 to a digital analog converter 30 and an analog to digital converter 32. Likewise the simulator computer 18 communicates through the bus 22 to an analog to digital converter 34 and a digital to analog converter 36. The devices 30, 32, 34 and 36 are interconnected through the field lines 26.

Figure 3:
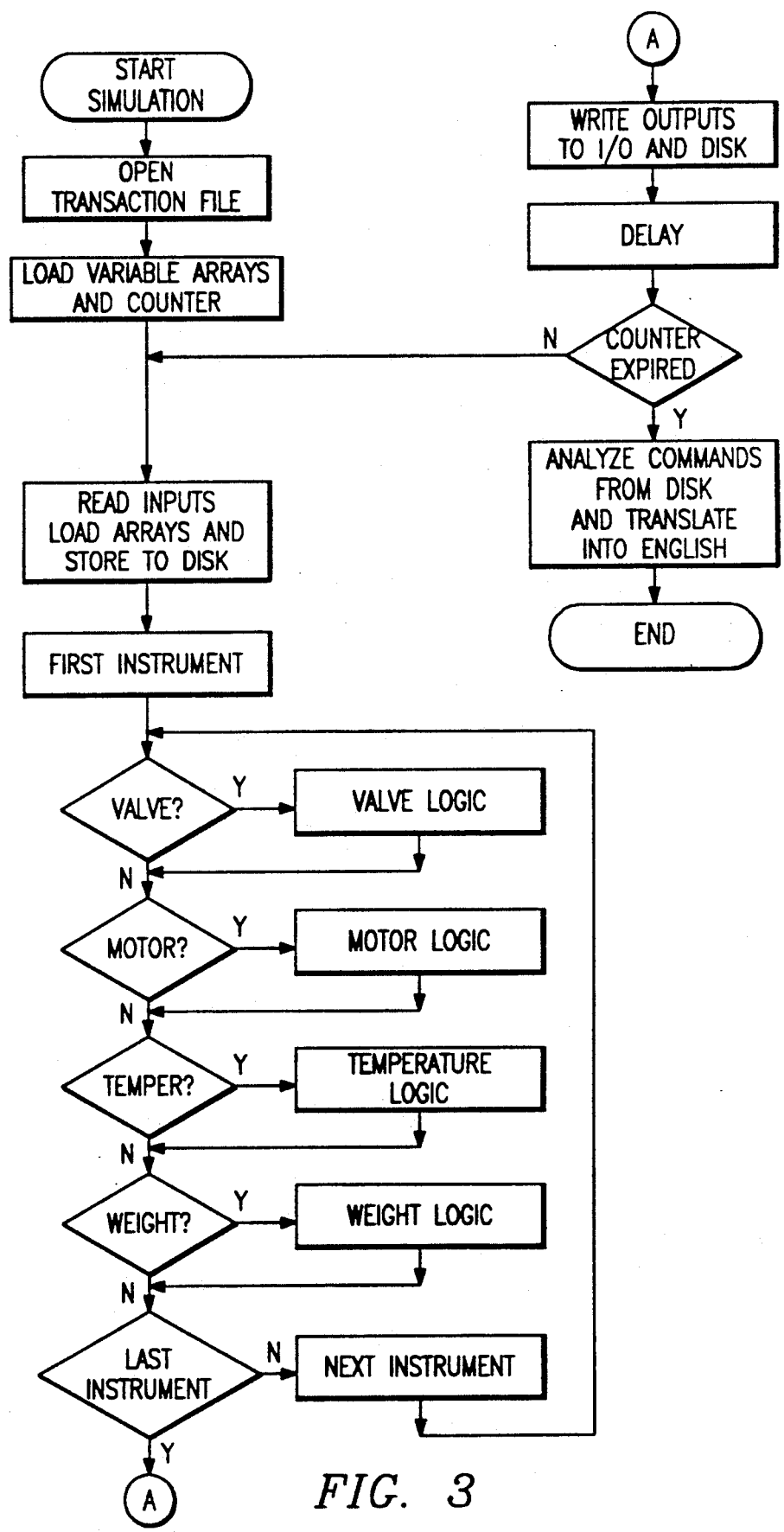
FIG. 3 is a flow diagram illustrating the operation of the simulator system software including the validation of the process control and simulator operation.

Referring now to FIG. 3, there is shown a logic diagram for the operation of the software within the simulator computer 18. Upon initiation of the simulation a transaction file is opened and variable arrays and a counter are implemented. Inputs are read from the output of the simulator hardware 24 and stored in the arrays and then stored in the disk drive. This is done for a first instrument, such as a weight, temperature or valve instrument. This is continued for various other instruments, which may include a valve, motor, temperature measurement and weight. Examples of logic for a valve and weight instrument are given in FIG. 4.

When the last instrument has been monitored, the computer 18 generates the commands that are transmitted to the simulator hardware 24. These outputs are then transferred to the documentation file on the disk drive 20. After a delay time and expiration of a counter, the documentation file is analyzed and translated into English commands for review of the operator. These are then transferred for producing a print out on the printer 21.

Figure 4A:
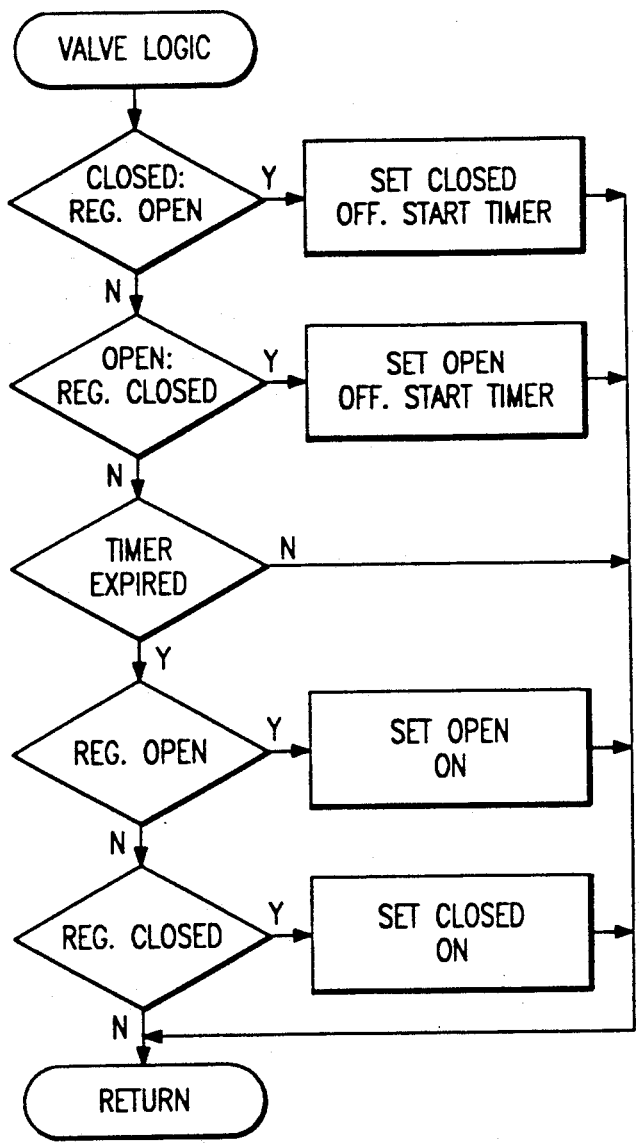
FIGS. 4A and 4B are detailed flow diagrams illustrating operation of the valve logic associated with the process control system and simulator of the present invention.
Figure 4B:
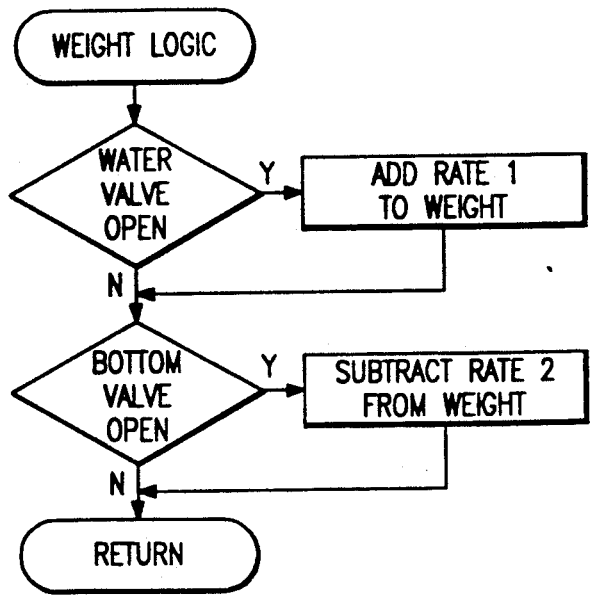

Referring to FIG. 4, there is shown the valve logic which responds to a request for opening and closing. There is also shown a flow diagram for weight logic with respect to adding a given weight of water by opening and closing a water valve.

Figure 2A:
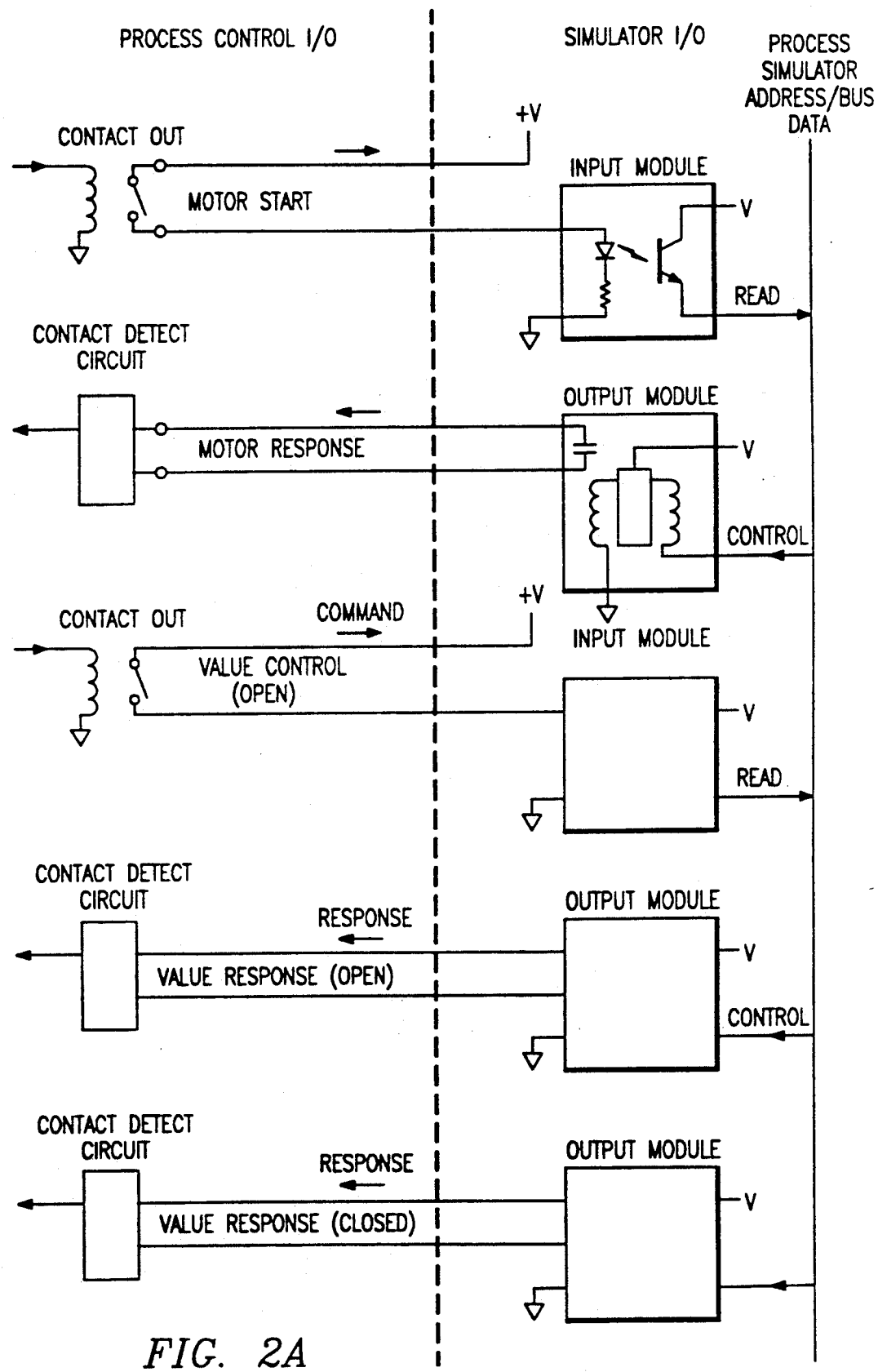
FIG. 2A depicts the electrical circuitry associated with the process control system and simulator of the present invention.

FIG. 2a illustrates further electronic components for the process and simulator input/output hardware.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

I claim:

1. A method for documenting process control and simulation operation in a system having a process control computer which transmits commands to and receives responses from process input/output hardware and a simulator computer which transmits commands to and receives responses from simulator input/output hardware, comprising the steps of:

monitoring the output signals produced by said simulator hardware in response to input signals received at the simulator hardware from the process hardware, recording the occurrence of said output signals in a documentation file at said simulation computer, monitoring the command signals generated by said simulator computer and transmitted to said simulator hardware, wherein said command signals are generated in response to said input signals, and recording the occurrence of said command signals generated by said simulator computer in said documentation file to produce documentation for the operation of said process control computer and said simulator computer.

2. A method as recited in claim 1 including the step of printing said documentation file.

3. A method as recited in claim 1 including the step of comparing information in said documentation file to a process operation which was carried out by said process control computer.

4. A method for operating and documenting process control and simulation operation in a system having a process control computer which transmits commands to and receives responses from process input/output hardware and a simulator computer which has simulation software that transmits commands to and receives responses from simulator input/output hardware, the operation of the simulation software including the steps of:

monitoring the output signals produced by said simulator hardware in response to input signals received at the simulator hardware from the process hardware, recording the occurrence of said output signals in a documentation file at said simulation computer, generating and transmitting command signals corresponding respectively to said output signals received by said simulator computer, and recording the occurrence of said command signals generated by said simulator computer in said documentation file to produce documentation for the operation of said process control computer and said simulator computer.

5. A method as recited in claim 4 including the step of printing said documentation file.

6. A method as recited in claim 4 including the step of comparing information in said documentation file to a process operation which was carried out by said process control computer.

7. A method for documenting a process control and simulation operation in a system having a process control computer which transmits commands to and receives responses from process input/output hardware and a simulator computer which transmits commands to and receives responses from simulator input/output hardware, comprising the steps of:

recording in a documentation file said output signals produced by said simulator hardware in response to input signals received at the simulator hardware from the process hardware, recording in said documentation file said commands generated by said simulator computer generated in response to said input signals received at the simulator hardware from the process hardware, and translating said output signals generated by said simulator hardware and said commands generated by said simulator computer and storing said translations in said documentation file, whereby said output signals and said commands are stored in a human readable form.

8. The method of claim 7 further comprising the step of printing said translations of said output signals and said commands stored in said documentation file.

9. The method of claim 7 further comprising the step of comparing said translations of said output signals and said commands stored in said documentation file to a process operation which was carried out by said process control computer.

* * * * *